United States Patent [19]

Fuehrer et al.

[11] 3,858,459
[45] Jan. 7, 1975

[54] RETARDER CONTROL

[75] Inventors: Reece R. Fuehrer, Danville; Richard B. Anderson, Indianapolis, both of Ind.

[73] Assignee: General Motors Corporation, Detroit, Mich.

[22] Filed: May 14, 1973

[21] Appl. No.: 360,391

[52] U.S. Cl. ................................. 74/645, 74/864
[51] Int. Cl. ..................... F16h 47/08, B60k 21/06
[58] Field of Search .............................. 74/645, 864

[56] References Cited
UNITED STATES PATENTS

| | | | |
|---|---|---|---|
| 2,691,901 | 10/1954 | Maybach et al. | 74/645 |
| 2,950,629 | 8/1960 | Holdeman et al. | 74/645 |
| 2,978,928 | 4/1961 | Tuck et al. | 74/645 |
| 3,096,666 | 7/1963 | Christenson et al. | 74/645 |
| 3,293,934 | 12/1966 | Schaefer et al. | 74/645 |
| 3,638,771 | 2/1972 | Chana | 74/645 X |
| 3,691,872 | 9/1972 | Schaefer et al. | 74/869 X |

*Primary Examiner*—Samuel Scott
*Assistant Examiner*—P. S. Lall
*Attorney, Agent, or Firm*—A. M. Heiter

[57] ABSTRACT

A transmission having a torque converter with lockup clutch, hydrodynamic retarder and power shift gear unit and controls. The retarder operating chamber has toroidal flow and inlet and outlet passages providing pumping action varying as a function of toroidal flow. The main fluid supply regulated by the main regulator valve at a high pressure is connected to the gear unit controls and retarder controls. The lubrication fluid supply regulated by the lubrication regulator valve at an intermediate pressure is connected to the lubrication system. The overage from both the main and lubrication regulator valves is connected to the torque converter and in series to the cooler. The retarder manual valve in the retarder off position positions the relay valve in the off position to block the retarder chamber inlet and connect the retarder chamber outlet to exhaust and the cooler outlet to a low pressure converter regulator valve. The manual valve in the minimum to maximum retarding range of positions places the relay valve in the retarder on position connecting the retarder outlet to join the converter outlet to the cooler and the cooler outlet to the retarder inlet, disconnects cooler outlet from the low pressure regulator valve and connects retarder inlet to the retarder inlet regulator valve to regulate retarder inlet pressure between a minimum and a maximum directly as the manual valve moves from the minimum to maximum retarding position and to reduce retarder inlet pressure with increasing retarder speed to provide retarding capacity increasing as a substantially straight line function with speed.

11 Claims, 4 Drawing Figures

RETARDER CONTROL

CROSS REFERENCE TO RELATED APPLICATIONS

This application is related to the Applicant's application Ser. No. 345,725, filed Mar. 28, 1973.

BACKGROUND OF THE INVENTION

Transmissions having a drive train including a torque converter with a lockup clutch, a hydrodynamic retarder and a power shift transmission gear unit and controls including a fluid supply for the drive train units, a torque converter output shaft governor controlled lockup clutch shift valve, retarder controls and power shift or automatic gear unit controls are known as shown in the R. M. Tuck et al. Pat. No. 2,978,928 granted Apr. 11, 1961; H. W. Christenson et al. Pat No. 3,255,642 granted June 14, 1966 and R. H. Schaefer et al. Pat. No. 3,691,872 granted Sept. 19, 1972.

BRIEF DESCRIPTION

This invention relates to transmissions with retarders and controls and particularly to retarders and controls.

This invention provides a transmission and retarder control system in which the overage from the transmission control regulated supply and the lubrication regulated supply are connected to feed the torque converter. The torque converter outlet is connected through the cooler. In retarder off the cooler outlet flow is connected to the converter pressure regulator valve and returned to sump. In retarder on the retarder outlet is also connected through the cooler and the cooler outlet is connected to the retarder at a pressure regulated between a minimum and a maximum value by the retarder manual control and reduced with increasing retarder speed.

The retarder control has a manual control valve controlling an on/off relay valve and a variable retarder inlet pressure regulator valve. The manual valve in the off position places the relay valve in the off position. The relay valve in off position blocks retarder inlet flow and connects retarder outlet flow directly to sump and connects converter outlet flow after passing through the cooler to the converter pressure regulator valve and sump. The retarder manual valve on movement from off position moves through a range of on positions from minimum to maximum retarding positions. In these on positions the relay valve is placed in the on position blocking cooler outlet flow from the converter pressure regulator valve, connecting cooler outlet flow to the retarder inlet and the retarder inlet pressure regulator valve and also connecting retarder outlet flow to the cooler inlet. The manual valve controls the retarder inlet pressure regulator valve to provide retarder inlet pressure increasing from a minimum to a maximum pressure value as the manual valve moves from minimum to maximum retarding position and decreasing as a function of increasing retarder rotor speed. The reduction of retarder inlet pressure as a function of retarder speed decreases the normal exponential increase of retarder capacity with increasing retarder speed and is preferably sufficient to provide a substantially straight line increase of retarder capacity with increasing retarder speed so more of the available retarder capacity can be used and the incremental increase of retarder capacity with the incremental increase of speed will be sufficiently constant for good control. A governor with the same exponential curve as the retarder may be used to provide a straight line retarder capacity increase with valve movement.

These and other features of the invention will be more apparent from the following drawing and description of a preferred embodiment.

DESCRIPTION OF PREFERRED EMBODIMENT

Figure 1:
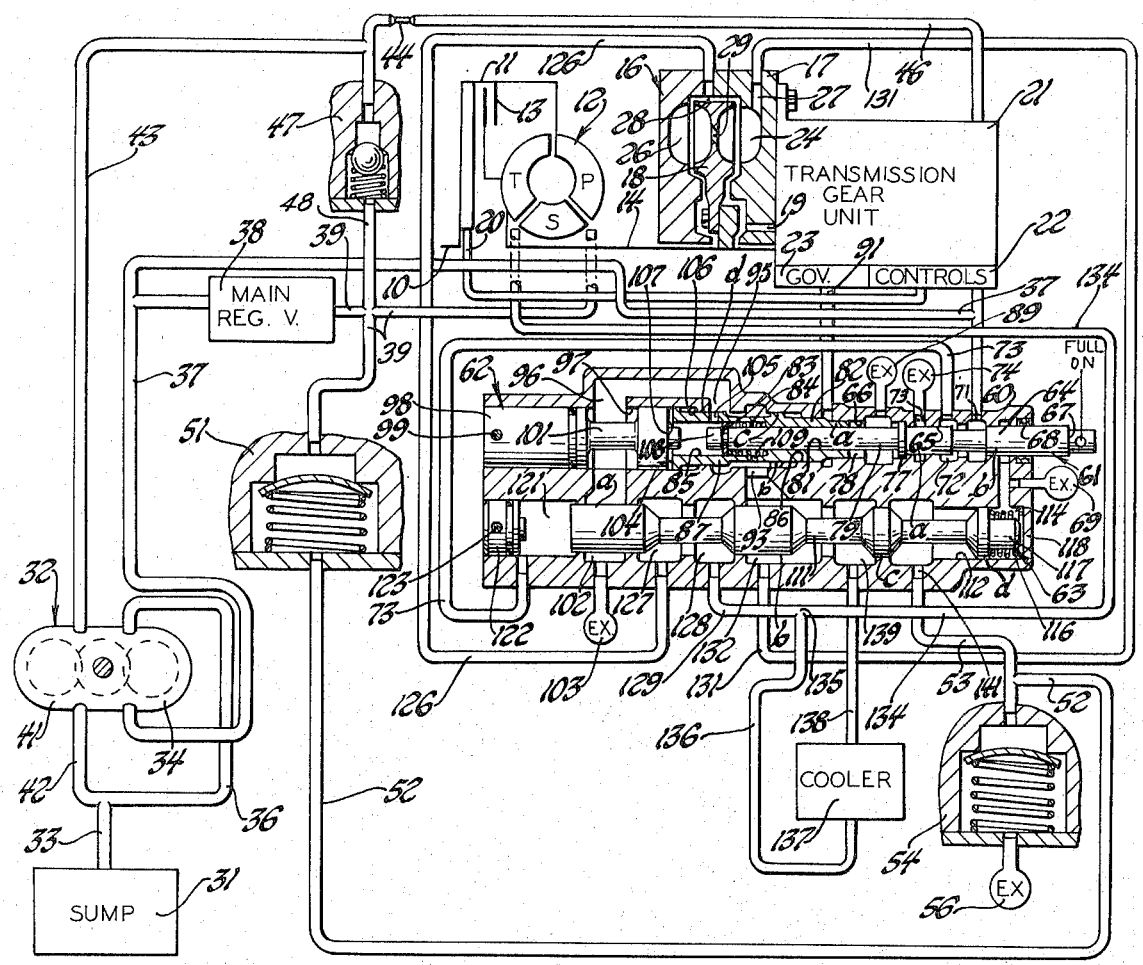
FIG. 1 is a schematic of the transmission with retarder and controls showing the retarder valve unit in on position.

Referring to FIG. 1, the transmission drive train has an input shaft 10 which drives the pump housing 11 of a torque converter 12. The torque converter has a conventional pump P driven by the input shaft and drives the turbine T driving the intermediate shaft 14, functionally the turbine, retarder or transmission input shaft. The grounded stator S provides torque multiplication. The torque converter also includes a conventional fluid actuated lockup clutch 13. A retarder 16 has a stator housing 17 and a rotor 18 located in the stator housing and splined to intermediate shaft 14. The stator housing has an atmospheric vent 19. The retarder is located between the torque converter 12 and the transmission gear unit 21. The controls 22 have an input or intermediate shaft governor 23 providing governor pressure in line 91, a lockup clutch shift valve responsive to input governor pressure supplies fluid to line 20 to engage the lockup clutch and power shift or automatic shift controls 22. This drive train is of the type shown in the R. M. Tuck et al. Pat. No. 2,978,928 granted Apr. 11, 1961, the H. W. Christenson et al. Pat. No. 3,255,642 granted June 14, 1966, and the R. H. Schaefer et al. Pat. No. 3,691,872 granted Sept. 19, 1972, incorporated by reference. These patents show specific examples of the drive train, lockup clutch and transmission gear shift controls.

The retarder, FIG. 1, is of the dual chamber type having an inlet chamber 24 and a downstream chamber 26 both providing toroidal flow and an inlet passage construction 27 for inlet flow to the inlet chamber 24 and an outlet passage construction 28 in both chambers for outlet flow from both chambers. When fluid is supplied to the inlet passage 27 of retarder 16, the toroidal flow provides injection inlet pumping action to supply fluid to the inlet chamber 24. The transfer passage 29 between the inlet chamber 24 and the downstream chamber 26 divides this flow to simultaneously fill both chambers and to aid in equal circulation of fluid through the chambers during retarding. Both chambers have an outlet passage which provides outlet pumping action also varying as a function of toroidal flow. The structural details and the operation of this retarder and the inlet outlet and transfer passage flow and the toroidal flow relationships are more fully shown and explained in the applicant's copending application Ser. No. 345,725 entitled "Transmission with Retarder and Controls" filed Mar. 28, 1973, incorporated by reference.

The hydraulic control system for the torque converter 12, lockup clutch 13, retarder 16 and transmission gear unit 21 shown in FIG. 1 employs transmission fluid from the transmission sump 31. The three gear or two unit pump 32 draws fluid from the sump through the suction line 33. The pump 32 has a first unit 34 supplying fluid from the suction line branch 36 to the main line 37 to the transmission controls 22. Main line 37 is regulated at a high pressure by the main regulator valve 38 and the overage connected to the converter inlet line 39. The pump 32 has a second unit 41 delivering fluid from the suction line branch 42 to the lubrication supply line 43 which is connected through a restriction 44 to the lubrication feed line 46 connected to the transmission. The pressure in lubrication supply line is regulated by the lubrication regulator valve 47 and the overage is connected by lubrication overage line 48 to the converter inlet line 39.

The pressure in the converter inlet line 39 is limited by the converter relief valve 51 which limits the converter inlet pressure to an intermediate value, i.e. 105 psi, and has a pressure differential, i.e. 50 psi, and delivers overage fluid to the overage line 52 which is delivered to the converter pressure regulating line 53 controlled by the converter pressure regulator valve 54 which regulates pressure at a low value, i.e. 55 psi, and returns the overage through exhaust 56 to sump. The converter relief valve 51 only functions when the converter cooler flow circuit to the regulator valve 54 is abnormally restricted, as by cold oil or fluid, since as explained below under normal conditions converter pressure regulator valve 54 regulates cooler outlet pressure at a low value so converter inlet pressure is less than the limit established by the converter relief valve 51.

The retarder control means has in the valve body 60 a manual valve 61, a pressure regulator valve 62 and a relay valve 63. The manual valve 61 has a valve element 64 having equal diameter lands $a$ and $b$ mounted for reciprocation in the smallest or manual valve bore portion 65 of bore 66 from the retarder maximum or full on position, FIG. 1, through a range of partial retarding positions to a minimum retarding position, all being retarder on positions and then to the retarder off position, FIG. 2, by means of a suitable linkage connected to the actuator end 67 which projects from the valve body. The actuator end 67 of valve element 64 is sealed to the valve body 60 in bore 66 by a seal 68 and leakage fluid pressure buildup is prevented by exhaust 69. With the manual valve element 64 in the on position shown, the main line 37 is connected via main line port 71 and the recess between valve lands $a$ and $b$ to the relay port 72 and relay line 73 and the exhaust 74 is blocked by land $a$. At the other end of land $a$ from the recess the valve element 64 has a shoulder 76 abutting the step 77 between the smallest bore portion 65 and the larger first intermediate size or smallest regulator valve bore portion 78 which limits movement of the valve element at the full on position.

The shoulder 76 has clearance in bore 78 so that fluid is not trapped at step 77. The valve element 64 has, extending from land $a$, and beyond the shoulder, a smaller spring abutment stem 79 which extends through the bore 81 of sleeve regulating valve element 82 and has at its remote end a snap ring 83 providing a movable abutment for the spring 84. The spring also abuts on the shoulder between the small bore 81 and large spring chamber bore 85 of the regulator valve element 82. The sleeve regulator valve element 82 has a small diameter land $a$ fitting in the first intermediate size or small regulator valve bore portion 78, an intermediate diameter land $b$ fitting in a second larger intermediate diameter or intermediate regulator valve bore portion 86, large equal diameter lands $c$ and $d$ fitting in the large diameter bore portion 87. The first intermediate diameter bore portion 78 between the land $a$ of valve element 64 and the regulator valve element 82 has an exhaust port 88 connected to exhaust 89 to prevent the accumulation of leakage fluid between these valve elements. A governor pressure line 91 is connected at the step between the first and second intermediate bore portions 78 and 86 to act on the differential area between lands $a$ and $b$ of the regulating valve element 82 in all valve positions to provide a force proportional to retarder rotor speed opposing the spring force. A retarder inlet pressure port 93 is connected to the recess between lands $c$ and $d$ of the regulator valve element 82 and through restricted passage 94 in the guide land $c$ to provide retarder inlet pressure in retarder on positions to act on the unbalanced area of the regulating valve element 82 between the lands $b$ and $d$. The regulator valve element 82 is shown in exhausting regulating position in which the recess between lands $c$ and $d$ connects retarder inlet pressure port 93 to exhaust port 95 which is connected by the exhaust passage 96 to bore 97 and across bore 97 by recess 101 in fixed passage plug 98 secured in the bore by a pin 99. The central recess 101 of plug 98 provides an exhaust connection across bore 97 to the exhaust port 102 and exhaust 103. The regulator valve element 82 has at the free end of land $d$ a mechanical stop shoulder 104 located in largest diameter bore portion 97 which engages the step 106 between the largest plug bore portion 97 and large regulator valve bore portion 87 and engages the face 107 of plug 98 to limit movement of regulator valve element 82 to the required regulating movement. The shoulder has clearance with bore 97 and does not seal against face 107 so fluid is not trapped by the shoulder during regulating movement. The space between the plug 98 and the regulating and manual valve elements is connected by passage 105 radially through sleeve regulating valve element 82 in all positions to exhaust 95 and by spring bore 85 and the clearance between stem 79 and bore 81 in the regulator valve to the space between the manual valve element 64 and regulator valve exhaust port 88 and exhaust 89.

Figure 2:
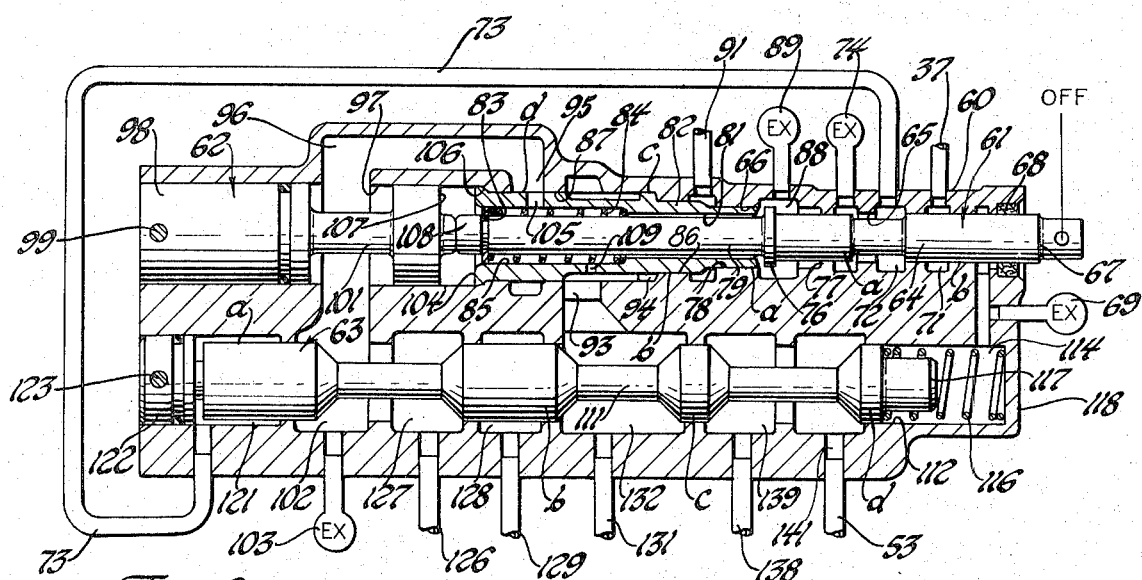
FIG. 2 is an enlarged view of the retarder valve unit in the off position.

An air vent restriction 109 extends radially through sleeve regulator valve element 82 from retarder inlet pressure port 93 to spring bore 85 and passage 105 to exhaust 95 to admit air so fluid is not trapped in retarder inlet pressure port 93 in retarder off position to assist retarder dumping. Inward movement of the manual valve element 64 at the retarder off position, FIG. 2, is limited when the free end 108 of stem 79 of the valve element engages the end of plug 98.

The relay valve 63 has a valve element 111 having lands $a$, $b$, $c$ and $d$ of equal diameter mounted in a bore 112 in the valve body 60 for reciprocal movement. In the spring chamber bore end 114, a spring 116 is mounted on a spring guide extension 117 of the valve element which guides the spring and limits movement of the relay valve element 111 in the retarder full on position shown in FIG. 1. The spring abuts the land $d$ and the bore end wall 118. The spring chamber 114 is vented by exhaust 69. The valve is moved to the retarder on position, shown in FIG. 1, when relay pressure is supplied through line 73 to the actuator chamber 121 at the other end of the bore 112 sealed closed by plug 122 secured in the bore by pin 123 to act on the piston end of land $a$ in this bore. When the relay line 73 is exhausted, the spring 116 moves the relay valve element 111 to the retarder off position, shown in FIG. 2, in which the piston end of land $a$ engages the plug 122. In the retarder on position, the retarder outlet line 126 connected to retarder outlet port 127 is blocked by land $a$ from communicating with exhaust port 102 and exhaust 103 and is connected between the lands $a$ and $b$ to the to-cooler port 128 which is connected to the to-cooler line 129. The retarder inlet line 131 connects the retarder inlet port 132 to the retarder inlet 27.

The converter outlet line 134 is connected at a junction 135 to the cooler inlet line 136. At this junction, in retarder on position, retarder outlet flow in to-cooler line 129 joins converter outlet flow to the cooler inlet line 136. The cooler inlet line 136 is connected through cooler 137 to cooler outlet line 138 and cooler outlet port 139 which is connected between lands $b$ and $c$ to retarder inlet port 132 for connection to retarder inlet 27. The converter pressure regulating port 141 which is connected to the converter pressure regulating line 53 is blocked between the lands $c$ and $d$.

In the retarder off position of the manual valve element 64, land $b$ blocks main line port 71 and main line 37 and connects relay line 73 and port 72 to exhaust 74 exhausting pressure in relay line 73. Exhaust 89 prevents accumulation of fluid in the space between the valve elements. Though governor pressure from line 91 continues to act on the unbalanced area between lands $a$ and $b$ of regulator valve element 82, the force provided by governor pressure is insufficient to move the regulator valve element 82 against the spring at its full height since the retarder inlet pressure port 93 is at atmospheric pressure as explained below. The manual valve element 64 is in the limiting position with the end 108 of stem 79 engaging plug 98 and the regulator valve spring 84 holding the regulator valve element in a non-regulating position with shoulder 104 against step 106.

Since the relay line 73 and actuator chamber 121 are exhausted, the spring 116 holds the relay valve element 111 against plug 122 in the retarder off position. In this position the retarder valve element 111 continues to connect the regulator valve exhaust passage 96 to exhaust 103 and also connects the retarder outlet line 126 and port 127 between the lands $a$ and $b$ to the exhaust port 102 and exhaust 103 for quick dumping. The to-cooler port 128 is blocked at both sides by the land $b$ of valve element 111. The land $c$ enters the bore between the cooler outlet port 139 and the retarder inlet port 132 and thus blocks any flow from the cooler outlet to the retarder inlet and connects the cooler outlet line 138 and port 139 to the regulated pressure port 141 and line 53 to the converter pressure regulator valve 54 and sump.

While it is believed that the operation of this transmission and retarder and the control system therefor will be apparent from the above detailed description, it is believed desirable to summarize the operation. The input driven pump 32 provides in main line 37 a main line pressure regulated at a high value by the main regulator valve 38 and connected to the transmission controls 22 and the manual valve 61 of the retarder controls. The pump 32 also provides in line 43 a lubrication supply pressure regulated at an intermediate value by the lubrication supply pressure regulator valve 47 and connected through a restriction 44 to the lubrication line 46 of the transmission. The overage from the lubrication regulator valve 47 is connected by lubrication overage line 48 to join overage from the main regulator valve 38 in the converter inlet line 39 to supply torque converter 12 with operating fluid which flows through the converter operating chamber to the converter outlet line 134 and is employed as a retarder supply flow.

Figure 3:
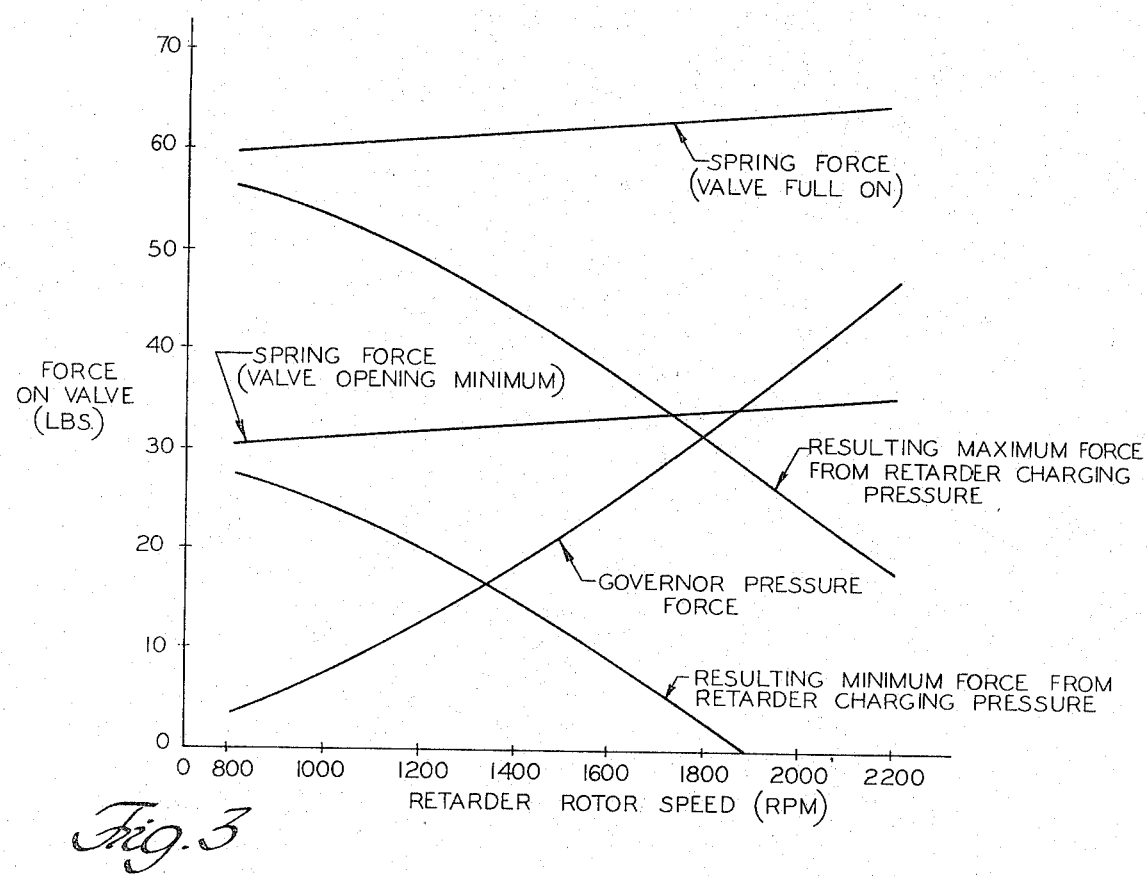
FIG. 3 is a plot of the forces on the retarder inlet pressure regulator valve as a function of retarder rotor speed.

In the range of retarder on positions from minimum to maximum retarding, the manual valve 61, as shown in FIG. 1, has the manual valve element 64 positioned to connect main line 37 to relay line 73 so main line pressure acts in actuator chamber 121 acts on the piston end of land $a$ to move the retarder relay valve 63 to the retarder on position shown. With the valves in the full on position shown in FIG. 1, the converter outlet pressure in line 134 joins the retarder outlet pressure in to-cooler line 129 at junction 135 and both pressures are connected to flow through cooler inlet line 136, cooler 137, cooler outlet line 138 to the cooler outlet port 139. The cooler outlet flow from port 139 is connected to the retarder inlet port 132 and in parallel to line 131 to supply the retarder and to the retarder pressure port 93 to act on the differential area between lands $b$ and $d$ of the retarder inlet pressure regulator valve element 82. Since there is a recess or opening restriction 94 through the land $c$, the land $c$ acts as a guide land and as a dampening land. With the manual valve element 64 in the retarder full on position shown in FIG. 1, the abutment 83 positions the spring 84 to provide the maximum spring force on the regulator valve element 82 in the maximum pressure regulating position. The governor pressure from line 91 on the differential area between lands $a$ and $b$ of the regulating valve element 82 provides an opposing force increasing with increasing retarder speed. Since the retarder inlet or charging pressure acts on the differential area between lands $b$ and $d$ of the regulator valve 82 in the same direction as the governor force and both oppose the spring force, the resulting maximum force from the retarder charging pressure decreases with increasing speed or varies inversely relative to speed. Thus, with increasing speed the charging pressure is decreased as a function of increasing speed, as shown in the curves, FIG. 3. As the retarder manual valve is moved from the retarder on position through a full range of partial retarding positions, the main line connection through main line port 71 and relay port 72 and relay line 73 is maintained to continue holding the relay valve 63 in the retarder on position. During such movement from the retarder on position, movement of the retarder valve element 64 moves the abutment 83 so that the force delivered by spring 84 to the regulator valve element 82 is continuously reduced from the maximum spring force to the minimum spring force as shown in FIG. 3. Reducing the spring force from the maximum spring force to the minimum spring force which cooperates with the force due to the governor pressure provides a resulting minimum force from the retarding charging pressure. This provides the minimum charging pressure for minimum retarding. Thus the retarder charging pressure may be decreased from the maximum retarder charging pressure, i.e. 75 psi, to a minimum retarder charging pressure, i.e. 10 psi, by manual control of the manual valve and also decreases as a function of increasing retarder speed. The retarder, due to its pumping action at both the inlet and outlet passages, provides reduced retarding power capacity with reduced charging pressure.

When the retarder manual valve 61 is in the retarder full on position or any partial retarding position, as pointed out above, it supplies main line pressure to the actuator chamber 121 to hold the retarder relay valve 63 in the retarder on position shown, FIG. 2. The retarder relay valve 63 in the retarder on position for partial to full on retarding connects the cooler outlet line 138 and port 139 between the lands $b$ and $c$ to the retarder inlet port 132 and line 131 where it is pumped by the injection pumping action of the retarder inlet passage 27 into the retarder chambers. The retarder inlet port 132 is also connected by the retarder inlet pressure port 93 to act on the regulator valve to regulate the retarder inlet pressure as pointed out above. The retarder pumps fluid through the outlet passage 28, the outlet line 126 and port 127 where it is connected by the retarder valve between lands $a$ and $b$ to the to-cooler line 129 to join at junction 135 the converter outlet flow in line 134 and both retarder outlet flow and converter outlet pass flow through cooler inlet line 136, the cooler 137 and cooler outlet line 138 and return to the retarder inlet in a loop or series circuit. Retarder outlet flow is blocked by land $a$ from exhaust 103 and cooler outlet flow in port 139 is blocked by land $c$ from the pressure regulator line 53.

Figure 4:
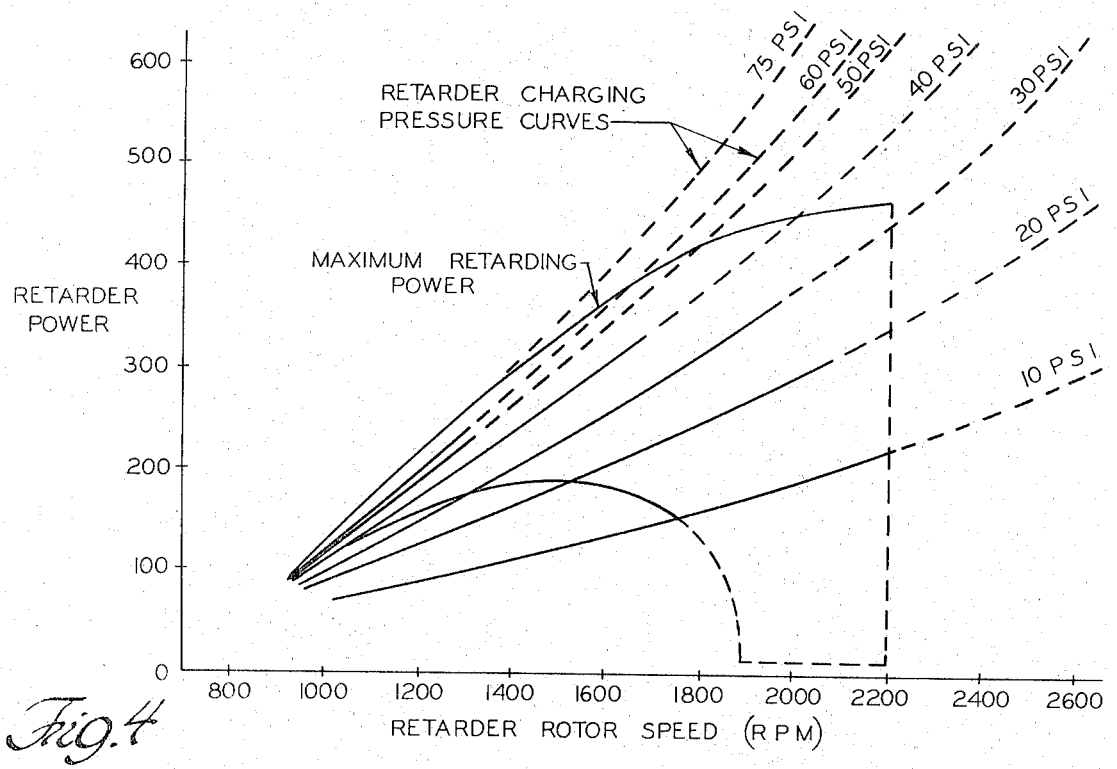
FIG. 4 is a plot of retarder horse power as a function of retarder rotor speed in the range of charging pressures showing the maximum retarding horse power.

The retarder pumping flow and power capacity increase as an exponential function of retarder speed and also increase as a function of retarder inlet pressure. The inlet pressure range is limited to a maximum pressure to use less than the full power capacity of the retarder so the substantially straight increasing slope line initial portion with some steeper rise portion approaching maximum capacity of the exponentially increasing power capacity curve with increasing speed at each inlet pressure value is used, as shown by the family of pressure curves, FIG. 4. The inlet pressure regulator valve 62 as shown in FIG. 3 regulates retarder inlet pressure as the inverse exponential function of governor pressure or speed and at each speed provides variation between a minimum pressure and a maximum pressure as a straight line function of valve movement except for the small variation due to the rate of the spring. The governor pressure curve also being an exponential function of speed, exponentially reduces the retarder power capacity. As shown by the maximum and minimum power curves, FIG. 4, this reduction may exponentially reduce the rate of power increase with speed to provide less change with speed at higher speeds. A small change of pressure due to manual change of the spring force as shown in FIG. 3 may be used as minimum retarding power in the middle speed range is not essential. If minimum retarding power in the middle speed range is required a longer stroke spring and manual valve is used to further reduce the minimum spring force, which could provide zero charging pressure at minimum retarding at all speeds. The governor could be selected to provide a pressure curve inversely matching or similar to the maximum retarder pressure, i.e. 75 psi power curve to provide a straight line increase of power capacity with increasing speed.

As the manual valve element 64 moves past the minimum retarding position to the retarder off position, the land $b$ closes the main line pressure ports 71 and connects the relay line 73 through its port 72 between the lands $a$ and $b$ to exhaust 74 and its end face 108 abuts the plug member 98 to limit further movement. Exhausting of the actuator chamber 121 through relay line 73 permits the spring 116 to move the retarder relay valve element 111 to the off position shown in FIG. 2. The relay valve in the off position connects the retarder outlet line 126 and port 127 between the lands $a$ and $b$ to exhaust port 102 and exhaust 103. The land $b$ of relay valve element 111 engages the bore at both sides of port 128 to block communication to and from port 128 so retarder outlet flow is blocked from the to-cooler line 129 and all converter outlet flow in converter outlet line 134 flows to the cooler inlet line 136 through the cooler 137 to the cooler outlet line 138. The cooler outlet line 138 and its port 139 are connected between the lands $c$ and $d$ to the port 141 and regulated pressure line 53 so that the cooler outlet pressure is regulated at a low value, i.e. 55 psi by the converter pressure regulator valve 54. The land $c$ is positioned in the bore between the cooler outlet port 139 and the retarder inlet port 132 so there is no flow to the retarder. Since the retarder inlet pressure is quickly reduced to atmospheric pressure or no fluid pressure, there is no pressure in port 93 and the governor pressure, acting on the regulator valve element 82, is insufficient to move the regulator valve against the light or less than minimum spring force and the regulator valve remains closed. The air vent 109 at the retarder inlet pressure regulator valve 62 and air vent 19 at the retarder chambers permits quick dumping of the lines and chambers. The air vent 109 is sufficiently small that the amount of fluid bleed during retarding is inconsequential.

It will be appreciated that modifications may be made of the illustrative embodiment shown above.

What is claimed is:

1. In a retarder: retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid from said inlet passage to said outlet passage and providing retarder circulation and power capacity increasing as a function of rotor speed; governor means operatively connected to said rotor providing a rotor speed signal proportional essentially solely to rotor speed and control means connected to said inlet and outlet passages and said governor means and having restriction means connecting the outlet passage to the inlet passage and fluid supply and pressure regulating means for supplying fluid under pressure and regulating the fluid pressure value in the inlet passage in response to said fluid pressure value in the inlet passage and said rotor speed signal to control inlet pressure as a function of rotor speed to reduce the increase of power capacity with rotor speed.

2. In a retarder: retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid from said inlet passage to said outlet passage and providing retarder circulation and power capacity increasing as a function of chamber fill and rotor speed; governor means operatively connected to said rotor providing a rotor speed signal proportional essentially solely to rotor speed and control means connected to said inlet and outlet passages and said governor means and having a restriction and connecting the outlet passage through the restriction to the inlet passage forming a loop circuit, supplying fluid under pressure to said loop circuit and regulating the fluid pressure value in the inlet passage by variably exhausting excess fluid from said inlet passage in response to inlet pressure and said rotor speed signal to control inlet pressure as a function of said rotor speed signal to provide a reduced increase of power capacity with rotor speed.

3. In a retarder: retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid from said inlet passage to said outlet passage and providing retarder circulation and power capacity increasing as an exponential function of chamber fill and rotor speed; governor means operatively connected to said rotor providing a rotor speed signal varying as an exponential function essentially solely to rotor speed similar to the power capacity exponential function of rotor speed and control means connected to said inlet and outlet passages and said governor means and having a restriction and connecting the outlet passage through the restriction to the inlet passage forming a loop circuit, supplying fluid under pressure to said loop circuit and regulating the fluid pressure value in said inlet passage in response to inlet pressure and said rotor speed signal to control inlet pressure as a similar exponential function of said rotor speed signal to provide power capacity increasing substantially as a straight line function of rotor speed.

4. In a retarder: retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid from said inlet passage to said outlet passage and providing retarder power capacity increasing as a function of chamber fill and rotor speed; governor means operatively connected to said rotor providing a rotor speed signal proportional essentially solely to rotor speed and fluid supply control means connected to said retarder inlet and outlet passages and said governor means and having a manual control movable between a minimum position and a maximum position of a retarding demand range of positions and a manually controlled valve means controlled by said manual control and operative to supply fluid to said inlet passage at a pressure limited to a low range of values so that the employed minimum to maximum retarder power capacity range is limited to the lower portion of the available retarder power capacity increasing with a moderate increase approaching maximum employed power capacity with increasing retarder speed and to regulate the inlet pressure value in response to inlet pressure, retarding demand position of said manual control and said rotor speed signal between a minimum and a maximum pressure value varying with manual control position and varying as a function of said rotor speed signal to provide an employed power capacity increasing as a straighter line function relative to manual control movement and rotor speed.

5. In a retarder: retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid from said inlet passage to said outlet passage and providng retarder power capacity increasing as an exponential function of chamber fill and rotor speed; governor means operatively connected to said rotor providing a rotor speed signal varying as an exponential function essentially solely to rotor speed similar to the power capacity exponential function of rotor speed and fluid supply control means connected to said retarder inlet passage and said governor means and having a manual control movable between a minimum position and a maximum position of a retarding demand range of movement and a manually controlled valve means controlled by said manual control and operative to supply fluid to said inlet passage at a pressure limited to a low range of values so that the employed minimum to maximum retarder power capacity range is limited to the lower portion of the available retarder power capacity increasing with a moderate exponential increase approaching maximum employed power capacity with increasing retarder speed and to regulate the inlet pressure value and chamber fill in response to inlet pressure, retarding demand position of said manual control and said rotor speed signal between a minimum and a maximum retarder inlet pressure value with manual control movement and varying the retarder inlet pressure value inversely exponentially as a function of rotor speed to provide an employed power capacity increasing as a straighter line function relative to manual control movement and rotor sped.

6. In a retarder: retarder means having an inlet passage, an outlet passage, a bladed stator and a bladed rotor forming a retarder chamber with said inlet passage connected to supply fluid to said chamber, and said outlet passage connected to said chamber and said rotor during rotation circulating fluid from said inlet passage to said outlet passage and providing retarder power capacity increasing as an exponential function of chamber fill and rotor speed; governor means operatively connected to said rotor providing a rotor speed signal proportional essentially solely to rotor speed and fluid supply control means connected to said retarder inlet passage and said governor means and having a manual control movable between a minimum position and a maximum position of a retarding demand range of positions and manually controlled valve means controlled by said manual control and operative to supply fluid to said inlet passage to regulate the inlet pressure value in response to inlet pressure, retarding demand position of said manual control and said rotor speed signal by said manually controlled valve means between a minimum and a maximum regulated pressure and chamber fill with manual control movement from minimum to maximum position and decreasing the regulated pressure as a function of said rotor speed signal with increasing rotor speed to provide a power capacity increasing as a straighter line function relative to manual control movement and rotor speed.

7. The retarder described in claim 6 and said governor means providing a rotor speed signal varying as an exponential function essentially solely to rotor speed similar to the power capacity exponential function of rotor speed and said manually controlled valve means being operative to regulate the inlet pressure value in response to sid rotor speed signal with an inverse exponential relation to the increasing power capacity with the rotor speed to provide power capacity increasing substantially as a straight line function relative to rotor speed.

8. In a transmission: a sump; a torque converter having an inlet and outlet; means to supply fluid from said sump under pressure to said torque converter inlet; a cooler having an inlet connected to the torque converter outlet and an outlet; a low pressure relief valve; retarder means having an inlet, an outlet, a bladed stator and a bladed rotor forming a retarder chamber with said retarder inlet connected to supply fluid to said chamber, said retarder outlet connected to said chamber and said rotor during rotation circulating fluid from said retarder inlet to said retarder outlet; control means having a manual control movable from a retarder off position through a minimum to maximum range of retarder on positions, a manually controlled valve means connected to said retarder inlet and outlet, said cooler inlet and outlet, said relief valve and said sump and controlled by said manual control in said retarder off position to connect said cooler outlet through said low pressure relief valve to sump, to block said retarder inlet and to connect said retarder outlet to sump and controlled by said manual control in said minimum to maximum range of retarder on positions to connect said retarder outlet to said cooler inlet, to block said cooler outlet from said relief valve and to connect said cooler outlet to supply fluid to said retarder inlet and pressure regulating means connected to said retarder inlet to regulate the retarder inlet pressure value in response to the retarder inlet pressure and the minimum to maximum range of retarder on positions of said manual control to control retarder inlet pressure by said manual control between a minimum and a maximum controlled pressure value with valve movement of said manual control in said minimum to maximum range of retarder on positions.

9. In a transmission: a sump; a torque converter having an inlet and outlet; means to supply fluid from said sump under pressure to said torque converter inlet; a cooler having an inlet connected to the torque converter outlet and an outlet; a low pressure relief valve; retarder means having an inlet, an outlet, a bladed stator and a bladed rotor forming a retarder chamber, said retarder inlet connected to supply fluid to said chamber, said retarder outlet connected to said chamber and said rotor during rotation circulating fluid from said retarder inlet to said retarder outlet and providing retarder power capacity increasing as a function of retarder chamber fill and rotor speed; governor means operatively connected to said rotor providing a rotor speed signal proportional essentially solely to rotor speed; control means having a manual control movable from a retarder off position through a minimum to maximum range of retarder on positions, manually controlled valve means connected to said retarder inlet and outlet, said cooler inlet and outlet, said relief valve and said sump and controlled by said manual control in said retarder off position to connect said cooler outlet through said low pressure relief valve to sump, to block said retarder inlet and to connect said retarder outlet to sump and controlled by said manual control in said minimum to maximum range of retarder on positions to connect said retarder outlet to said cooler inlet, to block said cooler outlet from said relief valve and to connect said cooler outlet to supply fluid to said retarder inlet and pressure regulating means connected to said governor means and said manual control and said retarder inlet to regulate the retarder inlet pressure in response to the retarder inlet pressure, the minimum to maximum range of retarder on positions of said manual control to control retarder inlet pressure by said manual control between a minimum and a maximum controlled pressure value to control retarder chamber fill with movement of said manual control in said minimum to maximum range of retarder on positions and said rotor speed signal for reducing said controlled pressure value as a function of said rotor speed signal with increasing rotor speed.

10. In a transmission: a sump; a torque converter having an inlet and outlet; means to supply fluid from said sump under pressure to said torque converter inlet; a cooler having an inlet connected to the torque converter outlet and an outlet; a low pressure relief valve; retarder means having an inlet, an outlet, a bladed stator and a bladed rotor forming a retarder chamber, said retarder inlet connected to supply fluid to said chamber, said retarder outlet connected to said chamber and said rotor during rotation circulating fluid from said retarder inlet to said retarder outlet and providing retarder power capacity increasing as an exponential function of retarder chamber fill and rotor speed; governor means operatively connected to said rotor providing a rotor speed signal varying as an exponential function essentially solely to rotor speed similar to the power capacity exponential function of rotor speed and control means having a manual control movable from a retarder off position through a minimum to maximum range of retarder on positions, manually controlled valve means connected to said retarder inlet and outlet, said cooler inlet and outlet, said relief valve and said sump and controlled by said manual control in said retarder off position operative to connect said cooler outlet through said low pressure relief valve to sump, to block said retarder inlet and to connect said retarder outlet to sump and controlled by said manual control in said minimum to maximum range of retarder on positions operative to connect said retarder outlet to said cooler inlet, to block said cooler outlet from said relief valve and to connect said cooler outlet to supply fluid to said retarder inlet and pressure regulating means connected to said governor means, said manual control means and said retarder inlet to regulate the retarder inlet pressure in response to the retarder inlet pressure and the minimum to maximum range of retarder on positions of said manual control to control retarder inlet pressure by said manual control between a minimum and a maximum controlled pressure valve to control retarder chamber fill with movement of said manual control in said minimum to maximum range of retarder on positions and said speed signal for reducing said controlled pressure value responsive to said rotor speed signal inversely exponentially as a function of rotor speed to provide an employed power capacity increasing as a straighter line function relative to manual control movement and rotor speed.

11. In a transmission: a sump; a torque converter having an inlet and outlet; means to supply fluid from said sump under pressure to said torque converter inlet; a cooler having an inlet connected to the torque converter outlet and an outlet; a low pressure relief valve; retarder means having an inlet, an outlet, a bladed stator and a bladed rotor forming a retarder chamber, said retarder inlet connected to supply fluid to said chamber, said retarder outlet connected to said chamber and said rotor during rotation circulating fluid from said retarder inlet to said retarder outlet and providing retarder power capacity increasing as an exponential function of retarder chamber fill and rotor speed; governor means operatively connected to said rotor providing a rotor speed signal proportional essentially solely to rotor speed and control means connected to said governor means, said retarder inlet and outlet, said cooler inlet and outlet, said relief valve and said sump, having a manual control having a retarder off position and a minimum to maximum range of retarder on positions and manually controlled valve means operative in a retarder off position of said manual control to connect said cooler outlet through said low pressure relief valve to sump, to block said retarder inlet and to connect said retarder outlet to sump and in said retarder on positions to connect said retarder outlet to said cooler inlet, to block said cooler outlet from said relief valve and to connect said cooler outlet to supply fluid to said retarder inlet at a pressure limited to a low range of values so that the employed minimum to maximum retarder power capacity range is limited to the lower portion of the available retarder power capacity increasing with a moderate exponential increase approaching maximum employed power capacity with increasing retarder speed and regulating the retarder inlet pressure between a minimum and a maximum pressure in response to movement of said manual control in said minimum to maximum range of retarder on positions and varying the retarder inlet pressure inversely exponentially as a function of rotor speed in response to said rotor speed signal to provide an employed power capacity increasing as a straighter line function relative to manual control movement and rotor speed.

* * * * *